N. F. REED.
Washing-Machines.
No. 139,736.
Patented June 10, 1873.
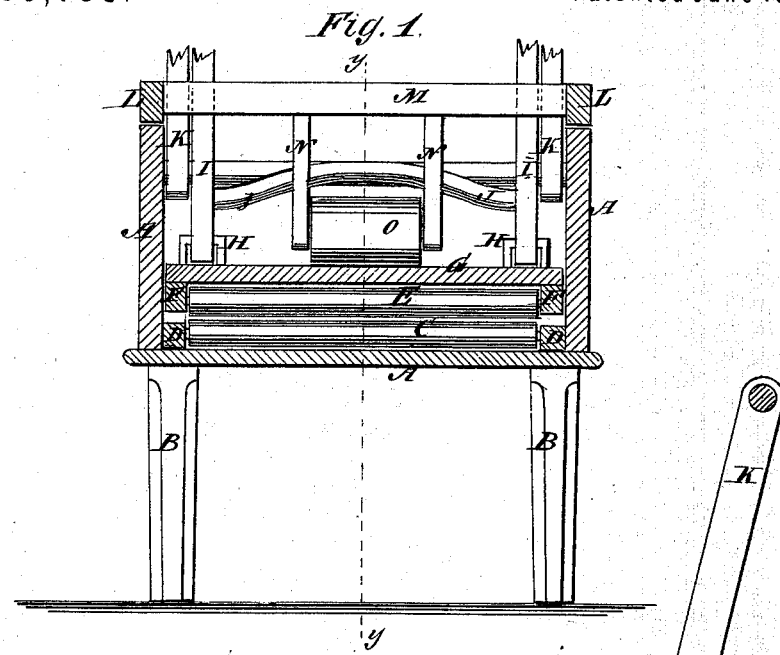
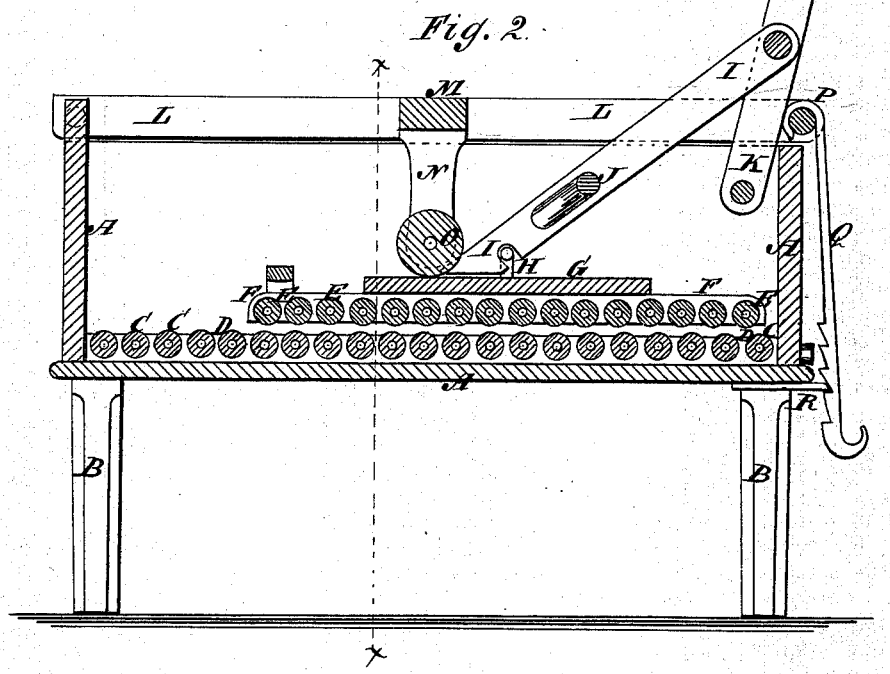
Witnesses:
E. Wolff.
Sedgwick
Inventor:
N. F. Reed
Per
Attorneys.

UNITED STATES PATENT OFFICE.

NATHAN F. REED, OF NORTH WOLCOTT, VERMONT.

IMPROVEMENT IN WASHING-MACHINES.

Specification forming part of Letters Patent No. 139,736, dated June 10, 1873; application filed May 5, 1873.

*To all whom it may concern:*

Be it known that I, NATHAN F. REED, of North Wolcott, in the county of Lamoille and State of Vermont, have invented a new and useful Improvement in Washing-Machines, of which the following is a specification:

Figure 1 is a vertical cross-section of my improved machine taken through the line $xx$, Fig. 2. Fig. 2 is a vertical longitudinal section of the same taken through the line $yy$, Fig. 1.

Similar letters of reference indicate corresponding parts.

My invention has for its object to furnish an improved washing-machine, simple in construction, convenient in use, easily operated, and effective in operation, washing the clothes quickly and thoroughly. The invention consists in the arrangement of the staples, the hook connecting-bars, and the levers, in connection with the roller-platform, roller-bottom, and box, and in the combination of the levers, the cross-bar, the downwardly-projecting arms, the roller, and the hook ratchet-bar, with the roller-platform, the roller-bottom, and the box, as hereinafter fully described.

A represents the box of my improved machine, which is made rectangular in form, and is supported upon legs B of such a length as to raise the machine to a convenient height. C is a set of rollers, the journals of which revolve in bars D of such a size that the rollers C may work clear of the bottom of the box A, and which form a roller-bottom to said box. E is a second set of rollers, the journals of which revolve in bars F, which are made shorter than the bars D, and are connected by boards G, thus forming a roller-platform or rubbing-board. To the sides of the middle part of the platform G are secured staples H, upon which hook notches formed in the lower ends of the bars I, which are connected and held in their proper relative position by a rod, J. The upper ends of the bars I are pivoted to the levers K or to a round connecting said levers. The lower ends of the levers K are pivoted to the sides of the box A, near one end, or to a round attached to said sides. The upper ends of the levers K are connected by a round which serves as a handle for operating the machine. By this construction, by moving the upper ends of the levers K back and forth the roller-platform E F G will be moved back and forth, rubbing the clothes between it and the roller-bottom C D, washing them quickly and thoroughly. L are two levers placed above the edges of the sides of the box A, and their ends are pivoted to the end of the said box. To the middle parts of the levers L are attached the ends of a cross-bar M, to which are attached the upper ends of two downwardly-projecting arms N, to and between the lower ends of which is pivoted the roller O. The free ends of the levers L are connected by a round, P, upon the middle part of which is hooked the hook formed upon the upper end of bar Q. Upon the inner edge of the lower part of the bar Q are formed ratchet-teeth which catch upon a catch-plate R attached to the end of the bottom of the box A. By this construction, by adjusting the hook ratchet-bar Q, the roller-platform E F G may be held down upon the clothes with any desired pressure.

Having thus described my invention, I claim as new and desire to secure by Letters Patent—

1. The arrangement of the staples H, hook connecting-bars I, and levers K, in connection with the roller-platform E F G, roller-bottom C D, and box A, substantially as herein shown and described.

2. The combination of the levers L, cross-bar M, arms N, roller O, and hook ratchet-bar Q, with the movable roller-platform E F G, roller-bottom C D, and box A, substantially as herein shown and described.

NATHAN F. REED.

Witnesses:
GEO. J. SLAYTON,
D. A. REED.